United States Patent [19]

Ladin

[11] Patent Number: 4,991,702
[45] Date of Patent: Feb. 12, 1991

[54] MOTOR VEHICLE CLUTCH CONTROL WITH CO-ACTING MULTIPLE ACTUATORS MOUNTED APART FROM THE AXIS OF A CLUTCH

[76] Inventor: Eli M. Ladin, 1608 Morton Ave., Ann Arbor, Mich. 48104

[21] Appl. No.: 311,114

[22] Filed: Feb. 15, 1989

[51] Int. Cl.[5] .............................................. F16D 25/08
[52] U.S. Cl. ................................ 192/85 C; 192/70.13; 192/91 R; 192/DIG. 1
[58] Field of Search ................ 192/91 R, 91 A, 85 C, 192/70.13, DIG. 1

[56] References Cited

U.S. PATENT DOCUMENTS

| | | | |
|---|---|---|---|
| 2,873,834 | 2/1959 | Kepner | 192/91 A X |
| 4,102,446 | 7/1978 | Rist | 192/91 A |
| 4,428,471 | 1/1984 | Parker et al. | 192/91 R X |
| 4,601,374 | 7/1986 | Ladin | 192/85 CA |
| 4,620,625 | 11/1986 | Ladin | 192/85 CA |
| 4,665,802 | 5/1987 | Barker et al. | 192/85 C X |
| 4,684,003 | 8/1987 | Leigh-Monstevens | 192/91 A X |
| 4,687,084 | 8/1987 | Leigh-Monstevens et al. | 192/85 CA |

FOREIGN PATENT DOCUMENTS

| | | | |
|---|---|---|---|
| 662766 | 8/1929 | France | 192/91 A |
| 571432 | 8/1945 | United Kingdom | 192/91 A |
| 1255002 | 11/1971 | United Kingdom | 192/91 A |
| 2083884 | 3/1982 | United Kingdom | 192/91 R |

Primary Examiner—Rodney H. Bonck
Attorney, Agent, or Firm—Alex Rhodes

[57] ABSTRACT

A motor vehicle clutch control for vehicles which are equipped with manual transmissions. The control has multiple hydraulic actuators which are mounted on a conventional stationary bell shaped housing which encloses a clutch. The actuators are positioned apart from the axis of the clutch and act directly on a member which is centered on the rotational axis of the clutch. The bell shaped housing has apertures which cooperate with the "off axis" mounting of the actuators to allow the inspection and the servicing of the actuators without the removal of the bell housing or other adjacent parts from a vehicle. In a first embodiment of the invention, the actuators are mounted on a detachable bracket in the interior of the housing and are accessible for installation and removal through an aperture in the side of the housing. In the second embodiment of the invention the actuators are mounted on the rear of the housing and have output members which extend through apertures in the rear of the housing. The "off axis" mounting cooperates with the apertures to allow their installation and removal from the housing.

16 Claims, 2 Drawing Sheets

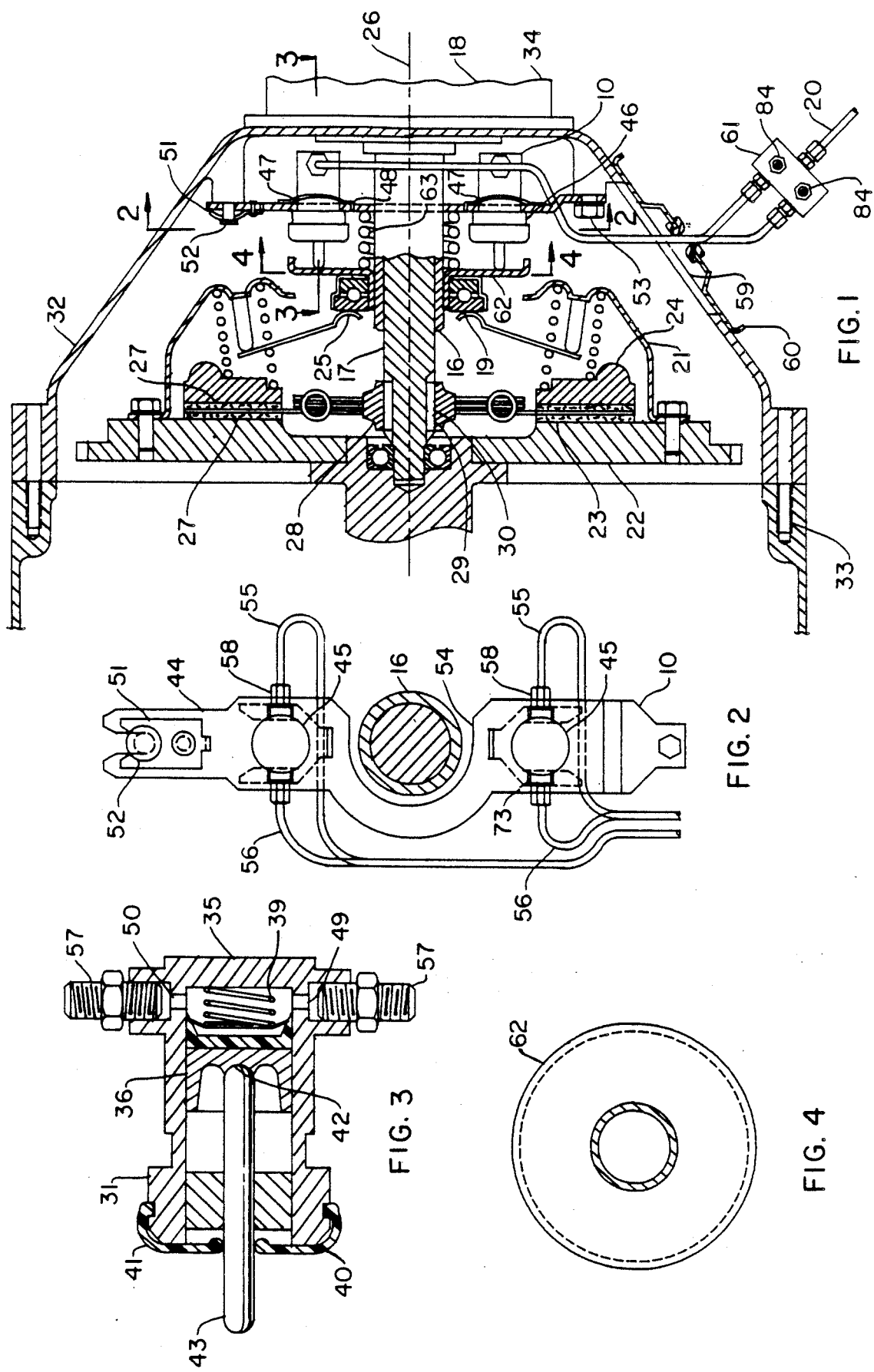

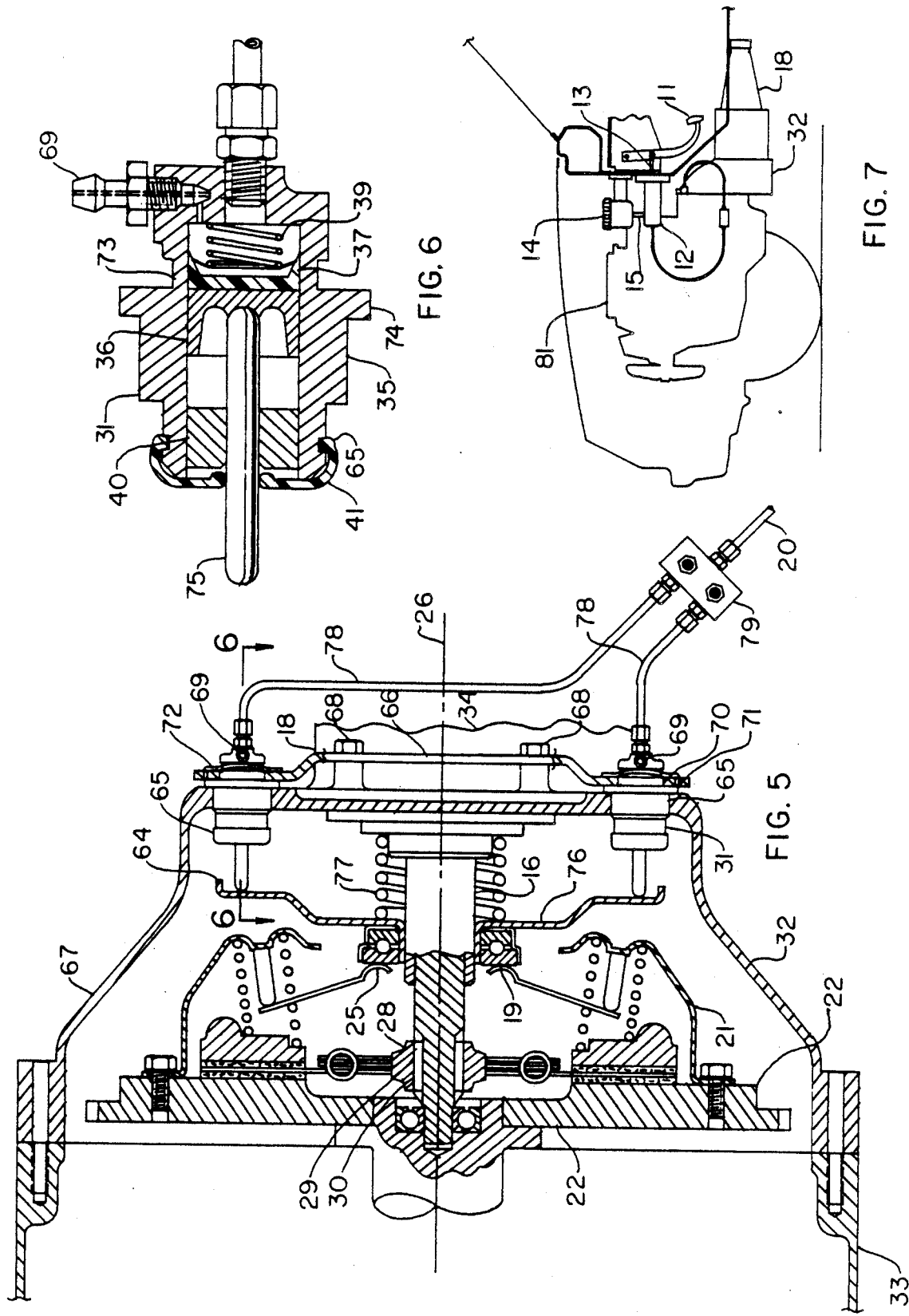

MOTOR VEHICLE CLUTCH CONTROL WITH CO-ACTING MULTIPLE ACTUATORS MOUNTED APART FROM THE AXIS OF A CLUTCH

BACKGROUND OF THE INVENTION

This invention relates to clutch controls for motor vehicles and more particularly to clutch controls for motor vehicles which are equipped with manual shifting transmissions It is a characteristic of motor vehicles that engines develop low power and torque at slow rotational speeds. It is also well known that the sudden application of loads to engines results in uncomfortable vehicle accelerations, violent shocks and/or engine stalling.

For the above reasons, clutches are provided for changing transmission gear ratios, increasing engine speeds and gradually applying loads to engines during vehicle start-ups. The clutch controls are activated when the driver depresses the clutch pedal thereby causing the clutch bearing to be pushed or in certain applications to be pulled against the spinning clutch fingers and causing the clutch to de-couple the transmission from the engine. During these de-couplings, the driver is able to shift the transmission to different gear ratios.

Clutch operating controls consist of basically three types: (1) fully mechanical linkage consisting of cable or rods and an actuating fork that activates the clutch bearing, (2) a hybrid system that consists of an hydraulic master cylinder that is connected via a fluid line to a hydraulic slave cylinder mounted outside the clutch housing that activates a fork that moves the bearing against the spinning clutch fingers, and (3) a fully hydraulic system where the fork and the external slave cylinder from (2) above are replaced by a complex annular slave cylinder that has a hole in its center through which the transmission input shaft must pass which in response to driver's activation of the master cylinder concentrically pushes the clutch bearing into the spinning clutch fingers. This system is often designated as concentric slave cylinder system or CSC system. With the CSC system the thrust load applied to the clutch bearing is concentric to or coaxial with the centerline of the input shaft because the CSC completely surrounds the input shaft and quill.

One serious problem with the mechanical and hybrid systems is that the pivoting forks push the bearing against the spinning clutch fingers in an offset arcuate manner while swiveling on a pivot. This action results in harmful scraping motions between the bearing and fork and between the bearing and its support tube or quill. This inefficient type of motion results in noise, chatter, vibration, contamination, heat, need for greater clutching effort by the driver and eventually premature failure of the clutching system.

With the above disadvantages of the mechanical and hybrid systems (utilizing forks), it has been demonstrated and accepted by industry that an hydraulic system using a concentric slave cylinder, while usually more costly, is more efficient or desirable than systems using forks.

In my prior invention described in U.S. Pat. Nos. 4,601,374 and 4,620,625, a concentric (CSC) hydraulic actuator and release bearing is provided which is in co-axial relationship with the clutch. Although this invention eliminates the wear problem caused by offset loads of the fork and compensates for clutch wear, it nevertheless has several significant disadvantages which the present invention eliminates while preserving its advantages.

One disadvantage of my prior invention and other CSC units is that serviceability is difficult and expensive. The replacement or inspection of the CSC hydraulic actuator and release bearing requires disconnecting the drive shaft, removal of transmission, disassembly of the stationary bell housing from engine block and many associated lines and conduits and is therefore a major vehicle disassembly. This lengthy process is repeated in reverse order when maintenance or replacement is completed. This disadvantage prohibits preventative maintenance and increases a manufacturer's warranty costs as well as the costs of vehicle ownership.

Another disadvantage is that optimum designs of the CSC hydraulic actuator and bearing are often not possible because of the limited space inside of the bell housing.

Another disadvantage is that an annular actuating cylinder is required which is costly to manufacture and inspect and is therefore less reliable than conventional style cylinders.

Another disadvantage is that every CSC unit because of its having a large shaft hole in its center has two cylindrical surfaces that must be sealed against leakage of fluid out and must also be sealed to stop outside contamination from entering and damaging the two cylinders that form the annulus of the CSC unit. The sealing against fluid leakage is done by an annular piston seal. Thus, during actuation of the CSC annular piston, the movement of the annular piston seal on the two different and unequal sized sliding surfaces in each CSC unit tend to twist the seal and double the potential for wear, friction and leakage over conventional actuator seals that seal on only one sliding surface and that are therefore not subjected to uneven twisting loads.

The sealing of the CSC unit against road contaminants such as dust, dirt, water, salt, metal filings, etc. is also exceedingly difficult and inherently deficient. Unlike a conventional automotive actuator that uses a boot seal that hermetically seals the actuator against environmental contamination, the CSC unit, because of the large shaft hole in its center, can only be equipped with marginal labyrinth or wiper type seals making the CSC unit very vulnerable to failure from normal road contamination.

Another disadvantage is the design is not easily adaptable to the "pull type" type clutches which is becoming increasingly popular for high torque vehicles.

Another disadvantage is the high tooling costs of the annular hydraulic cylinder which is used in the hydraulic actuator.

With the foregoing in mind, it will be later appreciated that the present invention provides significant advantages and benefits heretofore unavailable.

SUMMARY OF THE INVENTION

The present invention is a hydraulic control for a vehicle which is equipped with a manual shifting transmission. The control comprises easy to co-acting multiple interconnected slave cylinders or actuators which act on a common member to actuate a clutch during vehicle start-ups and transmission gear ratio changes. The resultant force of the multiple cylinders is preferably substantially collinear with the axis of the clutch. The cylinders can be internally mounted in the housing which encloses the clutch or externally mounted on the housing. The housing is apertured for the inspection installation and removal of the cylinders.

In the first aspect of the invention, the hydraulic cylinders are mounted on a common detachable bracket which is attached to the interior of the housing. The slave cylinders and bracket can be removed from the housing without removal of the housing by withdrawing them through an opening in the housing. In the alternative, the cylinders may be integral with the housing.

In the second aspect of the invention, the slave cylinders are mounted directly on the exterior of the bell housing or on a detachable bracket which is anchored on the housing. Push rods project out of the cylinders and exert forces on a clutch release bearing inside of the housing, either directly or on a thrust plate which contacts the release bearing.

One benefit of the invention is that clutch service is substantially simplified and reduced in cost over the earlier referenced hydraulic control. Another benefit is that the invention provides a great degree of freedom for locating the slave cylinders to optimize function and service of the control. Another benefit is that conventional highly reliable low cost components can be used. Another benefit is a potential for reducing manufacturers' warranty costs over the referenced hydraulic control.

Further features, benefits, and objects and manner of using the invention will be understood from the ensuing description and drawings which disclose the invention in detail.

BRIEF DESCRIPTION OF THE DRAWINGS

FIG. 1 is a longitudinal section through a clutch for a manual transmission and a clutch control which embodies the present invention.

FIG. 2 is a cross-sectional view drawn to an enlarged scale taken on the line 2—2 of FIG. 1.

FIG. 3 is a cross-sectional view drawn to an enlarged scale taken on the line 3—3 of FIG. 1.

FIG. 4 a cross-sectional view drawn to an enlarged scale taken on the 4—4 of FIG. 1.

FIG. 5 is a longitudinal section through a clutch for a manual transmission and a clutch control which embodies an alternate of the present invention.

FIG. 6 is a cross-sectional view drawn to an enlarged scale taken on the line 6—6 of FIG. 5.

FIG. 7 is a longitudinal sectional view through a vehicle showing the present invention.

DETAILED DESCRIPTION OF THE PREFERRED EMBODIMENT

Referring now to the drawings wherein like numerals designate like and corresponding parts throughout the several views, the present invention 10 generally comprises a driver's foot pedal 11 in the passenger compartment of a vehicle, a master cylinder 12 connected to the foot pedal 11 by a push rod 13, a remote fluid reservoir 14 connected to the master cylinder 12 by a fluid line 15, a non-rotating quill shaft 16 surrounding a rotatable transmission input shaft 17, said quill shaft 16 being anchored to the forward face of a transmission 18, a clutch release bearing 19 slideably mounted on the quill shaft 16, a pair of interconnected slave cylinders 31 spaced apart from the rotational axis 26 of a clutch 21, said slave cylinders 21 co-acting to produce a resultant force at or near the rotational axis 26 of the clutch 21 to advance the release bearing 19 on the quill shaft 16, and hydraulic lines 20 to hydraulically connect the master cylinder 12 with the slave cylinders 31.

The clutch 21 is conventional and is positioned between an engine 81 and the transmission 18 of a motor vehicle. The control 10 is operated by the driver to selectively couple and de-couple a rotating engine flywheel 22 to the transmission input shaft 17. The clutch 21 rotates with the flywheel 22 and is comprised of two members, namely, a friction disk 23 and a pressure plate 24. The friction disk 23 is adjacent to the engine's flywheel 22 and is splined to the transmission's input shaft 17. The pressure plate 24 is positioned between the release bearing 19 and friction disk 23 and is anchored to the engine's flywheel 22 The pressure plate 24 has fingers 25, designated as clutch fingers 25, against which the release bearing 19 acts when the control 10 is activated to permit transmission gear shifting and smooth vehicle start-ups. The flywheel 22, transmission input shaft 17, quill shaft 16, release bearing 19, friction disk 23 and pressure plate 24 are positioned on a common axis 26, herein referred to as the "clutch axis" 26.

The said friction disk 23 is a thin circular member and has a pair of annular facings 27 made of a composite friction material and a central hub 28 with an internal spline 29. The hub's internal spline 29 slideably engages the external spline 30 at the forward end of the transmission input shaft 17.

The friction disk 23 and pressure plate 24 are enclosed in a stationary bell housing 32 whose forward face is anchored to the engine's block 33 and whose rearward face is anchored to the transmission's housing 34.

The two slave cylinders 31, spaced apart from the clutch axis 26, is a principal feature of my invention. The cylinders 31 co-act to produce a resultant force upon the spinning clutch fingers 25 for disengaging the friction disk 23 from the flywheel 22. It will be appreciated that the use of multiple slave cylinders 31 rather than a single slave cylinder for obvious reasons is neither considered economic nor good engineering practice Although the present invention is contrary to what is considered to be good practice, multiple slave cylinders 31 provide substantial advantages over controls with forks and single complex slave cylinders, as exemplified by the earlier referenced CSC hydraulic control. One benefit is that the multiple slave cylinders 31 can be mounted externally, internally, with or without mounting brackets and made integrally with the clutch housing 32 to actuate the clutch release bearing 19 efficiently, free of the side loading or cocking forces present with the current fork systems.

Another benefit is that the slave cylinders 31 do not have to surround the transmission input shaft 17 and quill shaft 16, as is the case with the CSC system. Thus, the instant invention is extremely versatile and independent of shaft location. Another benefit is that small diameter slave cylinders 31 can be used which can be located in less space than a single slave cylinder.

Another benefit is that conventional low cost hydraulic cylinders 31 with records of excellent performance and reliability can be used. Another benefit is that boot type seals 41 can be provided to protect the slave cylinders 31 from moisture and other road contamination.

Another benefit is a substantial reduction in the time and cost for inspecting, maintaining and replacing the slave cylinders 31. Another benefit is that increased freedom is available to automotive designers with regard to chassis and transmission housing configurations and clutch characteristics.

Although only two slave cylinders 31 are shown in the drawings, it is obvious that more than two slave cylinders 31 can be used. Thus, combinations consisting of different numbers of cylinders 31, sizes of cylinders 31 and spacings from the clutch axis 26 can be used to satisfy these requirements. The angular positions of the cylinders 31 with respect to the clutch axis 26 should preferably be equal to produce a resultant force which is substantially collinear with the axis 26 of the clutch 21. However, the spacings of the cylinders 31 from the clutch axis 26 need not be equal to provide a resultant force which is substantially collinear with the clutch axis 26.

Referring now to FIG. 3, the slave cylinders 31 are conventional and similar in construction to hydraulic brake cylinders. The cylinder 31 is comprised of a housing 35, a piston 36 slideably mounted inside of the housing 35, a cup seal 37, a seal expander 38, a coil spring 39, a guide bushing 40 press fitted into the housing 35, and a boot seal 41. At the forward end of the piston 36 there is a spherical seat 42 which receives a spherical end portion of a push rod 43. When hydraulic pressure is applied to the head of the piston 36, the piston acts on the push rod 43 to move the push rod outwardly from the cylinder 31.

The slave cylinders 31 are mounted on a detachable bracket 44 which extends laterally across the interior of the bell housing 32, and preferably are disposed parallel to the clutch axis 26. The cylinders 31 pilot into apertures 45 through the mounting bracket 44 and are retained to the bracket 44 by the collar portions 46 of the cylinder housings 35 and spring retainers 47. The spring retainers have small tabs 48 which engage apertures 82 in the mounting bracket 44 to orient the cylinders 31 whereby their air bleed holes 49 are uppermost on the cylinders 31.

At the bottom of the cylinders 31 are inlet holes 50 for admitting a hydraulic fluid. The hydraulic fluid is preferably similar to hydraulic brake fluid, but may be any other suitable fluid, including air. It will be appreciated that alternatively, the slave cylinders 31 can be integral with the bell housing 32 by casting the piston's bores 83 as part of the housing 32.

The cylinders 32 are preferably pre-charged with the hydraulic fluid and pre-assembled to the bracket 44. The bracket 44 is anchored to the interior of the bell housing 32 at the inner end by engaging a spring retainer 51 fixed to the bracket 44 with a stud 52 fixed to the housing 32 and at the outer end by a fastener 53 which is in threaded engagement with the housing 32. The bracket 44 has a recess 54 which surrounds only the lower portion of the quill shaft 16 to permit removal of the bracket 44 from the housing 32 without first removing the quill shaft 16.

At the upper end of each cylinder 31, there is connected an air bleed line 55 and at the lower end of each cylinder 31 there is connected a fluid supply line 56 by conventional couplings 57 and fittings 58. The air bleed lines 55 and fluid lines 56 are routed below the transmission inlet shaft 17 and quill shaft 16, exit the housing 32 through an opening 59, and connect to a coupling block 61 wherein are bleed valves 84 and a hydraulic supply line 20 from the master cylinder 12. A cover 60 is provided to seal the opening 59 of the clutch housing 32 against water, dirt and other contaminants.

The pre-assembly and pre-charging of the cylinders 31 reduces vehicle assembly time and permits a final quality check of the cylinders 31 prior to installing and connecting the cylinders 31. The boot seals 41 and guide bushings 40 at the forward end portions of the cylinders 31 maintain the push rods 43 and pistons 36 in their proper positions prior to vehicle assembly.

The push rods 43 extend out of the cylinders 31 and contact a thrust plate 62 which pilots on the quill shaft 16 and bears against the rear surface of the release bearing 19. Alternatively, the thrust plate 62 can be combined with the release bearing 19, whereby the push rods 43 will act directly on the bearing 19. The thrust plate 62 is circular but may be of any other shape by simply keying the thrust plate 62 to the quill shaft 16. Between the thrust plate 62 and forward wall of the transmission 18 there is a coil spring 63 for pre-loading the release bearing 19 against the thrust plate fingers 25.

With reference to FIG. 7, the control system 10 is operated by depressing the foot pedal 11 in the interior of the vehicle. When the pedal 11 is depressed a piston inside of the master cylinder (not shown) is displaced causing fluid to flow from the master cylinder 12 through the hydraulic line 86 to the coupling block 61 and thence to the slave cylinders 31 in the interior of the clutch housing 32.

The fluid which enters the slave cylinders 31 and displaces the pistons 36 of the slave cylinders, causing the push rods 43 to move outwardlY from the cylinder 31 parallel to the clutch axis against the thrust plate 62 and move the release bearing 19 forward to depress the pressure plate fingers 25. The depression of the fingers 19 releases the friction disk 23 from the engine's flywheel 22 to de-couple the engine 81 from the transmission 18. In the case of a pull-type clutch (not shown), the piston 36 and inlet hole 50 can be reversed in the cylinder 31 to reverse the motion of the piston in an arrangement which exerts a pull force for disengaging the clutch.

When the driver's foot is removed from the pedal 11, the pressure plate fingers 25 return the slave cylinder push rods 43 and pistons 36 to their initial positions, causing the displaced fluid to flow back to the master cylinder 12, and returning the master cylinder piston (not shown) and foot pedal 11 to their initial positions.

With reference to FIGS. 5 and 6, in the second aspect 64 of the invention, two slave cylinders 65 and a detachable mounting bracket 66 are anchored to the exterior of a clutch housing 67 by the threaded engagement of conventional fasteners 68 with the housing 67.

The construction of the slave cylinders 65 as shown in FIG. 6 is similar to the slave cylinders 31 of the first aspect of the invention shown in FIG. 3, except for slight modifications to the cylinder housings 74 and the addition of bleed valves 69 which threadably engage the upper portion of the housing 74. The slave cylinders 65 pilot into apertures 70 of the bracket 66 and are retained to the bracket 66 by the collar portions 71 of the cylinder housings 74 and spring retainers 72. The spring retainers 72 engage the slotted grooves 73 of the cylinder housings 74 to position the bleed valves 69 uppermost on the cylinders 65.

Push rods 75 project out of the forward ends of the cylinders 65 and contact a circular thrust plate 76 in the interior of the clutch housing 67. As previously stated, other shapes can be used, if the thrust plate 76 is keyed to the quill shaft 16. Between the thrust plate 76 and transmission 18 there is a coil spring 77 which pre-loads the release bearing 19 against the pressure plate fingers 25. One end portion of fluid inlet lines 78 attaches to the cylinders 65 by conventional couplings 57 and fittings 58 and the other end portion to a coupling block 79 whereat the lines 78 are hydraulically interconnected and connected to a line 80 from the master cylinder 12.

From the foregoing it will be appreciated that the present invention provides an improved hydraulic control for operating a manual transmission clutch which is easily serviced, substantially reduces service costs and provides other significant benefits over hydraulic clutch controls heretofore available.

Although but two embodiments of the invention have been illustrated and described, it will be appreciated that other embodiments can be provided bY changes in the material, use of pneumatic instead of hydraulic actuators, shape, arrangement and substitution of equivalent parts without departing from the spirit thereof.

I claim:

1. In a motor vehicle of the type having an engine with a rotatable output member for applying the torque of the engine to a load, a transmission having a rotatable input member for receiving and transmitting the engine torque to said load, a clutch which is fixed to said engine output member and rotatable about the same axis as said engine output member for coupling and de-coupling said engine output member to said transmission input member, and a control for actuating said clutch to selectively couple and de-couple said engine output member to said transmission input member said control having a member which is moveable in the direction of the rotational axis of said clutch for actuating said clutch, the improvement comprising: a stationary bell housing mounted on said engine for enclosing said clutch and said moveable control member, said bell housing having an outer wall and at least one aperture in said wall for installing and removing a pair of actuators mounted inside of said housing which is located apart from the axis of said clutch; at least two actuators spaced apart from the axis of said clutch and mounted on said bell housing for displacing said moveable member to actuate said clutch and de-couple said transmission input member from said engine output member, each of said actuators comprising a housing and a piston, said actuator housings being detachably mounted to said bell housing such that said actuator housings are restrained from moving axially in said bell housing; and a means for detachably mounting said actuators to said bell housing apart from the axis of said clutch; said mounting means having an intermediate portion between said actuators which is eccentric to said clutch axis for installing and removing said actuators through said aperture of said bell housing when said housing is mounted on the vehicle's engine.

2. The improvement as recited in claim 1 wherein said actuators are located in the interior of said stationary bell housing.

3. The improvement as recited in claim 1 comprising two hydraulic actuators.

4. The improvement recited in claim 1 wherein said hydraulic cylinders are connected in parallel.

5. In a motor vehicle of the type having an engine with a rotatable output member for applying the torque of the engine to a load, a transmission having a rotatable input member for receiving and transmitting the engine torque to said load, a clutch which is fixed to said engine output member and rotatable about the same axis as said engine output member for coupling and de-coupling said engine output member to said transmission input member, and a control for actuating said clutch to selectively couple and de-couple said engine output member to said transmission output member, said control having a member which is moveable in the direction of the rotational axis of said clutch for actuating said clutch, the improvement comprising: a stationary housing mounted on said engine for enclosing said clutch and said moveable control member, said housing having an outer wall and at least one aperture in said wall which is located apart from the axis of said clutch; at least two actuators spaced apart from the axis of said clutch and mounted on said housing for displacing said moveable member to actuate said clutch and de-couple said transmission input member from said engine output member, said actuators being mounted on the exterior of said stationary housing and have output members which extend into the interior of said housing; and a means for detachably mounting said actuators on said housing wall apart from the axis of said clutch; said mounting means having an intermediate portion between said actuators which is eccentric to said clutch axis for installing and removing said actuators from a vehicle when said housing is mounted on the vehicle's engine.

6. The improvement recited in claim 5 wherein said actuators are hydraulic slave cylinders.

7. The improvement recited in claim 5 wherein said actuators are pneumatic type slave cylinders.

8. The improvement recited in claim 5 wherein said actuators are mounted on a common bracket which is attached to said clutch housing.

9. The improvement as recited in claim 8 further comprising a spring means for attaching said actuators to said bracket.

10. The improvement recited in claim 5 wherein said member which is moveable in the direction of the rotational axis of said clutch for actuating said clutch is a ball bearing.

11. A control for actuating a rotating motor vehicle clutch to couple and de-couple an engine from a transmission comprising, in combination: a stationary housing mounting on an engine, said housing having a side wall and an adjoining rear wall for enclosing a clutch and a pair of apertures extending through said rear wall which are located apart from the axis of said clutch; a driver's foot control for actuating said clutch; a master cylinder operatively connected to said foot control; and at least one pair of slave cylinders hydraulically connected to said master cylinder, said slave cylinders being mounted exteriorally on the rear wall of said housing apart from the rotational axis of said clutch and co-acting with each other to produce a resultant force for actuating said clutch which is substantially collinear with the axis of said clutch, each of said actuators having an output member, extending into the interior of said housing through said apertures, which is constrained to move reciprocally and parallel to the axis of said clutch in response to the movements of said foot control, whereby said actuators can be installed and removed from a vehicle when said housing is mounted on the vehicle's engine.

12. The improvement recited in claim 11 wherein said actuators are directly attached to said housing.

13. The improvement recited in claim 11 wherein said actuators are integral with said clutch housing.

14. The improvement recited in claim 11 further comprising a valve hydraulically connected to each of said hydraulic cylinders, said valves being located outside of the housing which enclosed said clutch and above said cylinders for removing air from said cylinders when said actuators are installed in a vehicle.

15. In a motor vehicle of the type having an engine with a rotatable output member for applying the torque of the engine to a load, a transmission having a rotatable input member for receiving and transmitting the engine torque to said load, a clutch which is fixed to said engine output member and rotatable about the same axis as said engine output member for coupling and de-coupling said engine output member to said transmission input member, and a control for actuating said clutch to selectively couple and de-couple said engine output member to said transmission output member, said control having a member which is moveable in the direction of the rotational axis of said clutch for actuating said clutch, the improvement comprising: a stationary housing mounted on said engine for enclosing said clutch and said moveable control member, said housing having an outer wall and at least one aperture in said wall which is located apart from the axis of said clutch; at least two actuators spaced apart from the axis of said clutch and mounted on said housing for displacing said moveable member to actuate said clutch and de-couple said transmission input member from said engine output member, said pair of actuators being detachably mounted on the inside of said housing; a means for detachably mounting said actuators on said housing apart from the axis of said clutch said means comprising a detachable bracket onto which said actuators are removably mounted, said bracket extending laterally across the interior of said housing and having a recessed center portion surrounding said transmission input member, a stud mounted in the interior of said housing adjacent to an end portion of said bracket, a spring retainer mounted on said end portion of said bracket and detachably engaging said stud, and a removable fastener for attaching the opposite end portion of said bracket to said housing, said fastener being accessible through said aperture of said housing to install and remove said bracket and actuators through said aperture when said housing is mounted onto said engine for installing and removing said actuators from a vehicle when said housing is mounted on the vehicle's engine.

16. In a motor vehicle of the type having an engine with a rotatable output member for applying the torque of the engine to a load, a transmission having a rotatable input member for receiving and transmitting the engine torque to said load, a clutch which is fixed to said engine output member and rotatable about the same axis as said engine output member for coupling and de-coupling said engine output member to said transmission input member, and a control for actuating said clutch to selectively couple and de-couple said engine output member to said transmission output member, said control having a member which is moveable in the direction of the rotational axis of said clutch for actuating said clutch, the improvement comprising: at least two actuators spaced apart from the axis of said clutch and mounted on said housing for displacing said moveable member to actuate said clutch and de-couple said transmission input member from said engine output member; a stationary housing mounted on said engine for enclosing said clutch and said moveable control member, said housing having a side wall and an adjoining rear wall, said rear wall has a pair of apertures extending through said rear wall apart from the axis of said clutch and each of said actuators has an outward extending output member and is removably mounted on the exterior said rear wall with each of said actuator output members extending through one of said apertures into the interior of said housing whereby each of said actuators can be installed or removed from said housing when said housing is mounted on said engine.

* * * * *

UNITED STATES PATENT AND TRADEMARK OFFICE
CERTIFICATE OF CORRECTION

PATENT NO. : 4,991,702
DATED : February 12, 1991
INVENTOR(S) : Eli M. Ladin

It is certified that error appears in the above—identified patent and that said Letters Patent is hereby corrected as shown below:

Column 2, line 62, after "easy to" insert --service--

Column 2, line 68, before "housing" insert --stationary bell--

Signed and Sealed this

Thirtieth Day of June, 1992

Attest:

DOUGLAS B. COMER

*Attesting Officer*     *Acting Commissioner of Patents and Trademarks*